United States Patent [19]

Amith

[11] Patent Number: 5,098,199
[45] Date of Patent: * Mar. 24, 1992

[54] REFLECTANCE METHOD TO DETERMINE AND CONTROL THE TEMPERATURE OF THIN LAYERS OR WAFERS AND THEIR SURFACES WITH SPECIAL APPLICATION TO SEMICONDUCTORS

[75] Inventor: Avraham Amith, Roanoke, Va.

[73] Assignee: ITT Corporation, New York, N.Y.

[*] Notice: The portion of the term of this patent subsequent to Jan. 2, 2007 has been disclaimed.

[21] Appl. No.: 563,812

[22] Filed: Aug. 6, 1990

Related U.S. Application Data

[60] Continuation-in-part of Ser. No. 399,729, Aug. 28, 1989, abandoned, which is a division of Ser. No. 157,196, Feb. 17, 1988, Pat. No. 4,890,933.

[51] Int. Cl.[5] .................. G01K 11/00; G01J 5/00
[52] U.S. Cl. .................... 374/121; 374/123; 374/161
[58] Field of Search ............ 374/120, 121, 127, 129, 374/132, 133, 161

[56] References Cited

U.S. PATENT DOCUMENTS

| | | | |
|---|---|---|---|
| 3,672,221 | 6/1972 | Weil | 374/161 |
| 4,302,970 | 12/1981 | Snitzer et al. | 374/161 |
| 4,539,473 | 9/1985 | Brogårdh et al. | 374/161 |
| 4,671,651 | 6/1987 | Toyoda et al. | 374/161 |
| 4,708,677 | 11/1987 | Blank et al. | 374/123 |
| 4,799,788 | 1/1989 | Berthet et al. | 374/121 |
| 4,890,933 | 1/1990 | Amith | 374/121 |

Primary Examiner—William A. Cuchlinski, Jr.
Assistant Examiner—C. W. Fulton
Attorney, Agent, or Firm—Arthur L. Plevy; Patrick M. Hogan

[57] ABSTRACT

A method of accurately determining the temperature of a thin layer of bandgap material without requiring contact to the layer involves the use of optical radiation reflected off the bandgap material and the detection of the reflected energy. The relationship between the temperature varying bandgap energy and the resulting reflection characteristics provides an indication of temperature, independent of ambient temperature.

17 Claims, 4 Drawing Sheets

REFLECTANCE METHOD TO DETERMINE AND CONTROL THE TEMPERATURE OF THIN LAYERS OR WAFERS AND THEIR SURFACES WITH SPECIAL APPLICATION TO SEMICONDUCTORS

This is a continuation-in-part of application Ser. No. 399,729, filed Aug. 28, 1989 now abandoned which is a division of application Ser. No. 157,196, filed Feb. 17, 1988 now U.S. Pat. No. 4,890,933.

FIELD OF THE INVENTION

The present invention relates to temperature-process control procedures. More particularly, the invention is applicable to the precise detection as well as control of the temperature of a semiconductor crystal and is especially useful in process steps where contact with the crystalline surface must be avoided, and where transmission methods are inapplicable. An example of an application of the invention involves the processing of GaAs thin layers, or of wafers prior to the growth of epitaxial layers, where the temperature must be accurately known and controlled, and no physical contact to the wafer surface can be tolerated, and where optical transmission may be inapplicable.

BACKGROUND AND SUMMARY OF THE INVENTION

In the processing of semiconductors, such as GaAs in this example, there are difficulties in measuring the temperature of wafers or of thin layers, especially in applications where the temperature has to be known accurately, and no physical contacts to the wafer (or thin layer) are permitted. Two examples of processes where these problems arise are "heat-cleaning" of wafers prior to growing subsequent layers on them by Molecular Beam Epitaxy, and preactivation "heat cleaning" of photocathodes.

A device which as been used in the past, in an attempt to overcome these difficulties is the pyrometer, which utilizes the black-body (or "gray body") radiation of the sample in order to measure its temperature. This method, however, is valid only when the wavelength of the radiation used is such that its characteristic coefficient of absorption is very large in comparison with the reciprocal of the thickness of the wafer or the thin layer. Such is rarely the case with wafers or thin layers of semiconductors such as GaAs, since the long wavelength light ($\lambda >$ 1000 nanometers) used in pyrometry is hardly absorbed (if at all) by the semiconductor whose bandgap energy exceeds that of the light. Only for thick wafers, having temperatures well above room temperature, can the pyrometric method be applied: in these situations, wavelengths of about 900 nanometers are employed.

Pyrometers, therefore, when used in applications to GaAs or to semiconductors of comparable bandgaps, almost always monitor the temperature of the body on which the semiconductor wafer rests rather than the actual temperature of the semiconductor material. In the case of the photocathode bonded to a glass faceplate, the pyrometer (utilizing radiation well above 900 nanometers) absorbs radiation emitted by the glass faceplate. The cathode itself, which is totally transparent to such radiation, is not "seen" at all by the pyrometer; and, furthermore, the cathode layer introduces an additional complication by acting as a thin film interference filter. This latter effect causes the pyrometric temperature readings of the glass faceplate itself to be in error —depending on the thickness of the cathode layers. The thinner the cathode layer, the more sensitive the pyrometer reading to small variations in the layer's thickness.

It is sometimes possible to apply a transmission method to overcome the above limitations of the pyrometer. Indeed, the use of the transmission method has been described in some detail in U.S. Pat. No. 4,890,933 entitled TRANSMISSION METHOD TO DETERMINE AND CONTROL THE TEMPERATURE OF WAFERS OR THIN LAYERS WITH SPECIAL APPLICATION TO SEMICONDUCTORS issued on Jan. 2, 1990 to A. Amith et al and assigned to the assignee herein. In that patent, there is described a method of accurately determining the temperature of a thin layer of bandgap material without requiring contact to the layer. The method uses optical radiation through the layer and the detection of optical absorption by the layer. The relationship between the temperature varying bandgap energy and the resulting optical absorption characteristics provides an indication of temperature, independent of ambient temperature. Reference is also made to a copending patent application, Ser. No. 399,729 filed Aug. 28, 1989 as a divisional of the application resulting in the above-noted patent and having the same title, inventors and assignee. The present invention is based on the monotonic change in the optical absorption coefficient as a function of temperature. It furthermore depends on the condition that the light has an energy comparable to and/or slightly larger than the bandgap. In this regime, the reflectance will be a function of the absorption coefficient $\alpha$ as will be explained below. In the specific example to which the invention is applied herein, the controlling phenomenon is the narrowing of the bandgap of the semiconductor (it is the direct optical bandgap in the case of GaAs) with increasing temperature. Since the absorption coefficient $\alpha$ for light of a narrow spectral range whose photon energy is slightly higher than the bandgap energy, depends on the separation between these two energies, it follows that the absorption coefficient will depend on the temperature of the GaAs wafer or thin layer. The relationship between photon energy and the bandgap energy is shown in equation form in the specification. The energy of the narrow spectral range employed in this mode must be such that it stays near, yet above the band edge at the temperatures of interest (if, at any temperature, the bandgap exceeds the spectral energy, then the light will not be absorbed and therefore the absorption coefficient $\alpha$ will not be temperature-sensitive. Consequently, the optical reflectance will not be as temperature-sensitive as when it has the exponential dependence on $\alpha$).

Indeed, this invention is applicable to all materials whose optical absorption coefficient is a monotonic function of temperature. It is applicable, in particular, to all semiconductors and is enhanced by selecting narrow optical spectral ranges very close to the respective bandgaps. The underlying mechanism is the same as detailed in this description of the invention as applied to GaAs: the absorption coefficient of optical radiation close to the bandgap (and exceeding the latter's energy by a small amount) is a function of the bandgap. Since in all semiconductors the bandgap is a function of temperature, the invention applies to all semiconductors. It further applies to semiconductors wherein the bandgap is either direct or indirect.

It is the object of the present invention to determine the exact temperature of the semiconductor thin layer or wafer, without contacting the semiconductor physically, and without having light transmitted through the semiconductor.

The invention is based on measurement of optical reflectance, utilizing a properly selected narrow band spectral range which has an energy near the bandgap and slightly above it. Under these circumstances, the reflectance will depend exponentially on the absorption coefficient α. The coefficient α, in turn, will be a function of the bandgap. The bandgap, in turn, is a function of the temperature of the relevant semiconductor layer. Consequently, the optical reflectance will depend on the temperature of the layer or of the wafer.

The present invention does not only provide a method of accurate determination of the temperature, but it furthermore is employed — through an electrical feedback loop — to control said temperature by adjusting the power to the heating agent.

The method of this invention is applied by selecting a very narrow spectral range and measuring its reflectance off the wafer.

The invention contains a continuous comparison of the intensities of the light component reflected from the wafer, with that emitted by the light source. This "normalization" procedure enables one to separate those changes in reflectance off the wafer which are due to the latter's varying temperature, from changes which are due to variations in the intensity of the light source.

This invention overcomes many of the above-noted shortcomings and difficulties of existing pyrometric as well as transmission methods.

These and other objects of the invention are achieved according to the invention by providing a source of optical radiation having a desired spectral width and directing that optical radiation to a layer of material having a bandgap which varies as a function of temperature. The optical radiation reflected off the layer of semiconductor material is detected and analyzed to determine its value. Due to the relationship between direct bandgap and optical absorption coefficient α, analysis of the reflected optical radiation will provide an indication of the direct bandgap of the material which, in turn, is indicative of the material's temperature.

For a semiconductor wafer or layer, an in-situ temperature determination may be accomplished while the wafer is in a heating chamber even though the temperature detection apparatus is maintained outside the heating chamber. Of course, the temperature detection apparatus could just as well be wholly or partially within the chamber if it is tolerant of the processing temperatures. A light source of a given spectral content may be provided. Since the absorption coefficient for this spectral range depends on the separation between the photon energy and the bandgap energy, it is possible to derive information relating to the bandgap by examining the reflectance off the wafer in the spectral range of interest. Additionally, the direct bandgap of GaAs narrows as temperature increases. Thus, information regarding the temperature of the GaAs wafer may be derived from the reflectance of the identified spectral range.

DETAILED DESCRIPTION OF THE DRAWINGS

Figure 1:
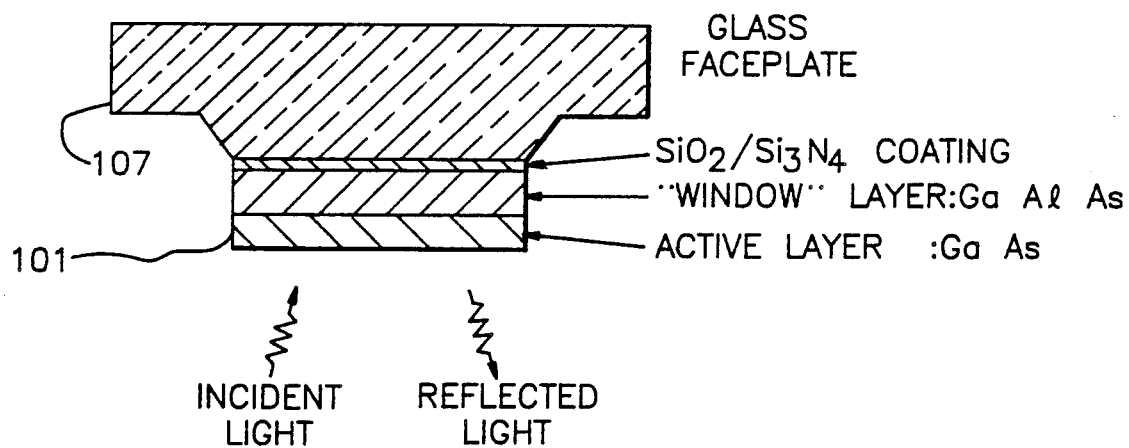
FIG. 1 illustrates a layer of GaAs on a supporting structure which is suitable for temperature monitoring in accordance with the invention.

An example of a layer of GaAs whose temperature may be directly determined according to the invention is the GaAs wafer 101 on a support 107 as shown in FIG. 1. The property of the material on which this invention is based is the dependence of the bandgap on temperature, and the dependence of the optical absorption coefficient, α, of light of a given energy on the difference between the latter and the bandgap energy (which must be smaller than the light energy). This property is found for instance in GaAs, other III-V compounds and other semiconductor materials such as silicon, Cds or HgCdTe. It applies to direct as well as indirect bandgap, although it is easier to exploit in the former. The above relationships may be expressed in the following manner:

$$Eg = Eg(T) \quad \quad 1$$
$$\alpha(h\nu) = \alpha(h\nu - Eg), \text{ where } h\nu \geq Eg \text{ (note } \alpha \approx \text{constant} \times (h\nu - Eg)^{\frac{1}{2}}) \quad \quad 2$$
hence,
$$\alpha - \alpha(T) \quad \quad 3$$

Relation No. 1 states that the semiconductor bandgap energy, Eg, is a function of the temperature, T. Relation No. 2 states that the absorption coefficient, α, for light of energy hv (where h is Planck's constant and v is the frequency) is a function of the difference between that energy and the bandgap energy, Eg. Relation No. 3 states that as a result of the above, the absorption coefficient α is a function of temperature. These equations are well known and described in the above-noted patent and the above-cited copending application.

This scheme of this invention is based on applying Kirchoff's Law of Radiation, wherein the material in question is quasitransparent with reflectance R, transmittance T, and emittance E, so that:

$$R + T + E = 1 \quad \quad 4$$

Let r be the Fresnel reflection coefficient:

$$r = \frac{n-1}{n+1} \quad \quad 5.$$

wherein the layer in question, having refractive index n, is exposed to air (or vacuum). The layers thickness is t and its absorption coefficient is α. The characterization of the material as quasitransparent means that $\alpha \neq 0$.

The reflectance R is given by:
$$R = r^2 [1 + (1 - 2r^2) \exp(-2\alpha t)] / [1 - r^4 \times \exp(-2\alpha t)] \quad \quad 6$$
This fundamental relation defines the dependence of R on α, and therefore on the temperature (see eq. 3).

Figure 2:
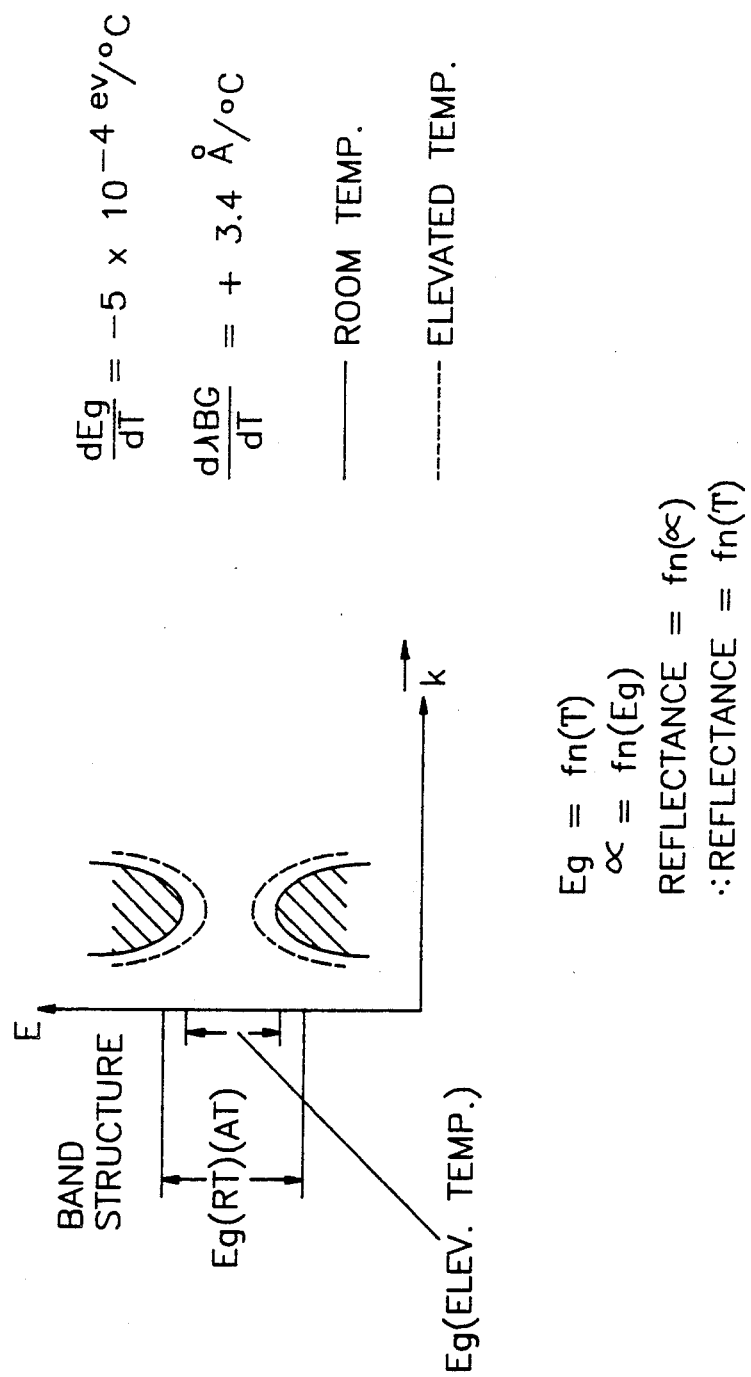
FIG. 2 is a plot showing the direct bandgap of GaAs as a function of temperature.

The pictorial rendition of the above is found in FIG. 2. The figure shows the change in the direct bandgap of a semiconductor as a function of temperature (the example is a semiconductor, such as GaAs, whose direct bandgap decreases as the temperature increases). It is noted that the bandgaps of all semiconductors, whether such bandgaps be direct or indirect, are functions of temperature. In most semiconductors, the bandgaps narrow upon increasing the temperature: the values of $dEg/dT$ range from $-14 \times 10^{-4}$ ev/·C in selenium to 31 0.3 $\times 10^{-4}$ ev/·C and $-4 = 10^{-4}$ ev/·C. In a few semiconductors, notably in the IV-VI compounds, the bandgaps widen upon increasing the temperatures, with values near $+4 \times 10^{-4}$ ev/· C. An example of a totally different class of materials where this invention is applicable, is a colloidal suspension of small particles in a matrix of another material, the more so if that matrix is amorphous, gel or a liquid ("Christiansen Filter"). In such cases, the absorption coefficient $\alpha$ in selected spectral ranges is a strong function of temperature, making the present invention applicable as a means to detect as well as control the temperature.

The device of this invention measures the optical reflectance at a selected wavelength off the sample whose temperature is to be determined, and is based on the temperature dependence of the optical coefficient of absorption.

The optical reflectance of a selected wavelength off a given sample depends not only on its coefficient of absorption $\alpha$, but also on the reflectance properties at the various interfaces, on the level of doping and on possible stresses. The effects of these other factors on optical reflection off the sample are almost independent of temperature.

Figure 3:
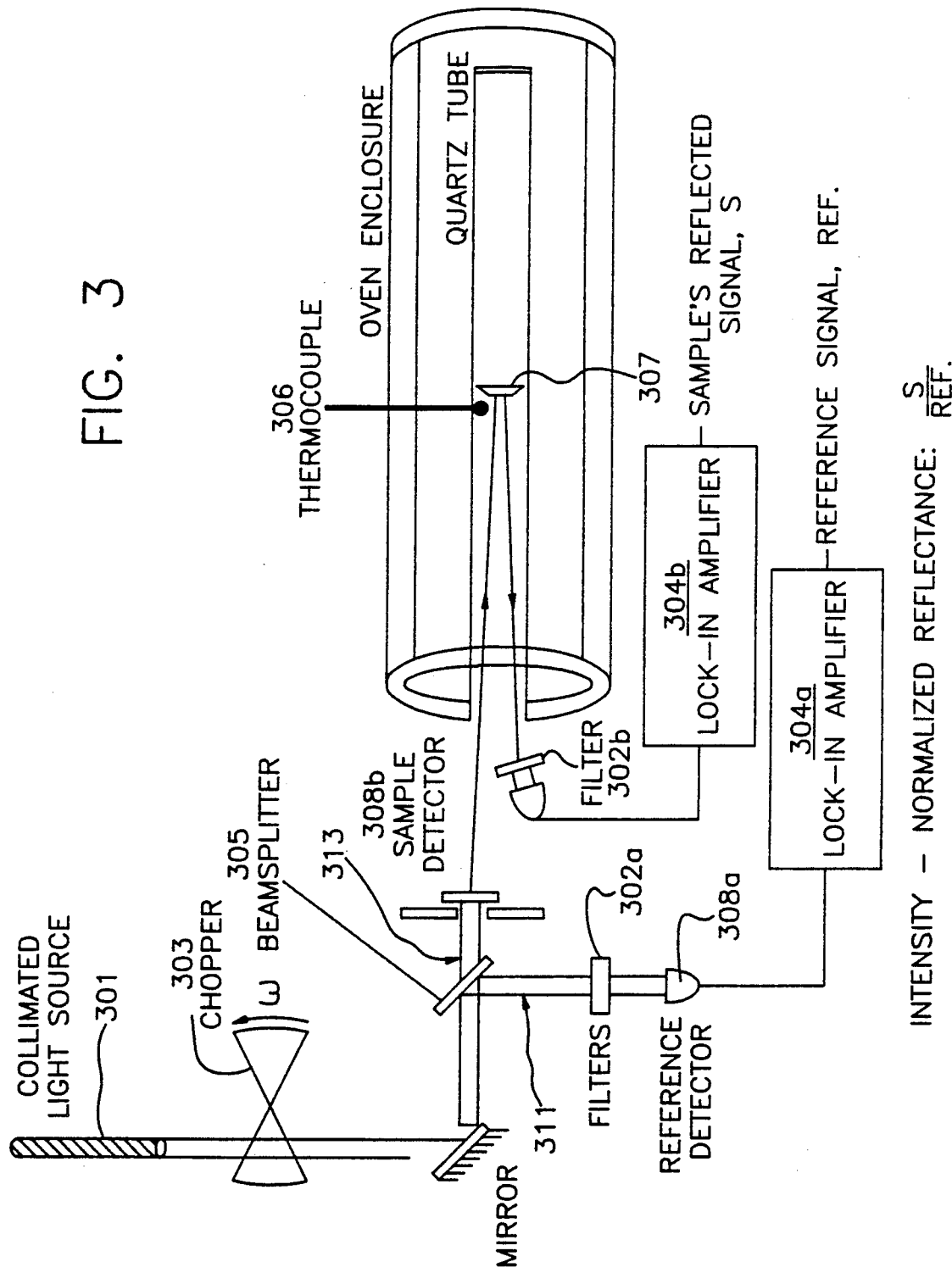
FIG. 3 illustrates a calibration setup for the invention, designed to derive $\alpha(\lambda, T)$.

The manner of calibrating the reflectance measuring device is demonstrated in FIG. 3. The light from a lamp 301 is chopped by a chopper 303 and then split by a beamsplitter 305 into a "reference" channel 311 and a "signal" channel 313 which goes to the prototype sample 307. The two filters 302$a$, 302$b$ in the respective channels are narrow bandpass filters which select the operating light energy (wavelength). The lock-in amplifier 304$b$ monitors the reflected signal from the sample, via sample detector 308$b$, while the lock-in amplifier 304$a$ reads the reference signal received via reference detector 308$a$. The signals from the sample, S, and the reference, R, are constantly compared to each other. The reflectance is monitored as the ratio of the former to the latter. The oven temperature is monitored by the thermocouple 306. The sample, in the oven enclosure, is at the temperature indicated by the thermocouple. The scheme illustrated in FIG. 3 embodies a generic approach to measure the sample's temperature by the reflectance method.

As mentioned earlier, a specific utilization of this device is to monitor the temperature of a GaAs wafer on a backing during "heat cleaning", or the temperature of a wafer (such as GaAs) during "heat cleaning" prior to growing epitaxial layers on the GaAs, for instance by the Molecular Beam Epitaxy method. In both bases, the careful monitoring of the light-source intensity, which may change during the heat-cleaning cycle, is essential.

Figure 4:
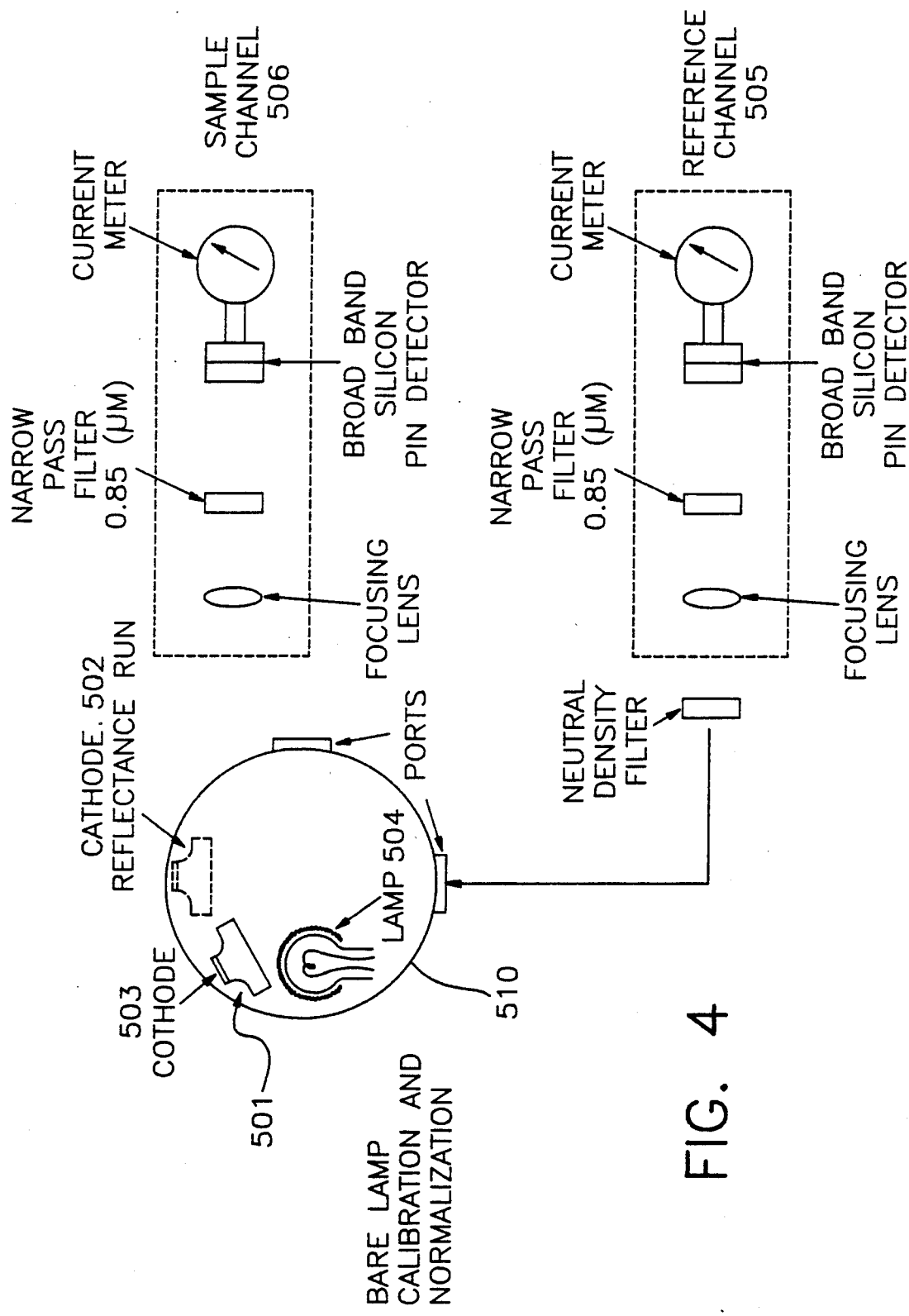
FIG. 4 illustrates a setup for monitoring the sample's temperature by implementing the invention.

One example of the embodiment of the invention is shown in FIG. 4, where "heat cleaning" of the sample takes place. The lamp 504 and the sample 503 are shown within the vacuum chamber 510. With the sample in position 501, the sample channel 506 and the reference channel 505 are compared for normalization purposes. The sample 503 is then moved to position 502 so that the path of the light reflected off its surface will enter the sample channel 506. At this point, a "room temperature reference signal" is taken, with the light source at a sufficiently low intensity so as not to heat the sample during this step. Next, the lamp intensity is increased and the sample gets heated accordingly.

The signals from the two channels are acquired by a computer, not shown, through two inputs of an A/D converter, not shown, and they are constantly being compared to provide a normalized (to constant optical flux) reflectance profile which is converted to a temperature profile according to the earlier calibration.

A description of the computer program to monitor the heat cleaning temperature and to control it, follows.

The software to control the heat clean process is written in a version of BASIC design for measurement and control purposes. The program uses the multitasking capability of this language to measure and control the process and to provide screen display, data storage and data printout.

With the sample in position, the heat clean lamp is operated briefly at low wattage. During this time, sampling measurements are made over a narrow wavelength band of light flux off the cathode and of light flux from the lamp. From these measurements a "room temperature" normalization ratio is computed. Subsequent measurements of reflectance off the cathode are divided by this number to normalize the reflectance to the room temperature value.

After a normalization ratio has been calculated, the measurement process is begun. The computer periodically samples light flux from the lamp and off the cathode and calculates the reflectance relative to the room temperature value. This value is compared to a setpoint value determined from a specified reflectance versus time profile. The program is structured to readily accommodate changes in the desired shape and complexity of this curve. Using a PID (proportional-integral-derivative) algorithm, a correction to the lamp wattage is calculated and a corresponding command voltage is sent to the power supply controlling the lamp. This sequence is periodically repeated until the process is completed.

This method, and the device, are applicable to measure the temperatures of any semiconductor wafers or thin layers wherein the bandgap, and therefore the absorption coefficient is temperature dependent.

The method is suited for any and all applications where physical contacts to the sample are undesirable, where emission pyrometry is inapplicable, and where optical transmission through the sample is difficult or impossible. The method is further applicable to situations of different mechanisms of heating the sample.

I claim:

1. An improved temperature detection apparatus for a workpiece of a material having a bandgap energy which varies as a function of temperature, said apparatus comprising:

a source of optical energy having a first spectral component with a photon energy greater than said bandgap energy at a given workpiece temperature;

an optical detection means for detecting said first spectral component of said optical energy from said source;

positioning means for causing said workpiece to be located on an indirect path between said source and said detection means whereby optical energy from said source is reflected off said workpiece at said first spectral component prior to detection of said optical energy by said detection means; and processing means for receiving a signal from said detection means and for providing an output indicative of the temperature of said workpiece as a function of the energy level of optical energy reflected by said workpiece.

2. The improved temperature detection apparatus according to claim 1 further comprising:
   a second optical detection means for detecting optical energy directly from said source or said first spectral component to provide a reference signal for said processing means.

3. An improved temperature detection apparatus according to claim 1, wherein said workpiece comprises a layer of GaAs.

4. An improved temperature detection apparatus according to claim 3, wherein said layer of GaAs is on a substrate.

5. An improved temperature detection apparatus according to claim 4, wherein said substrate comprises a glass layer.

6. An improved temperature detection apparatus according to claim 1, wherein said workpiece is a photocathode comprising a layer of GaAs on a glass faceplate.

7. An improved temperature detection apparatus according to claim 6, wherein said layer of GaAs is directly on a layer of GaAlAs and said GaAllAs is on said glass faceplate.

8. An improved temperature detection apparatus according to claim 6, wherein a layer of GaAlAs is between said layer of GaAs and said glass faceplate.

9. An improved temperature detection apparatus according to claim 1, wherein said source of optical energy is a heat source thermally coupled to said workpiece.

10. An improved temperature detection apparatus according to claim 9, wherein said heat source is an incandescent lamp emitting 'white light'.

11. A temperature detection apparatus for detecting the temperature of a bandgap material at a temperature of interest, said bandgap material having a first bandgap energy at said temperature of interest, said apparatus comprising:
   a source of optical energy including a first spectral component having a first photon energy slightly greater than said first bandgap energy,
   a sample optical detector for detecting the amplitude of said first spectral component of said optical energy and generating a first signal representative of the detected amplitude of said first spectral component,
   means for positioning said bandgap material on an indirect path between said source of optical energy and said sample optical detector, to cause said first spectral component of said optical energy to be reflected off said bandgap material to said sample optical detector,
   means for heating said bandgap material,
   a reference optical detector for detecting said first spectral component of said optical energy and generating a second signal representative of the detected amplitude of said first spectral component,
   comparison means for comparing said first and second signals representative of the detected amplitude of said first spectral component and for generating a signal representative of the temperature of said bandgap material based on said comparison.

12. A temperature detection apparatus as claimed in claim 11, wherein said signal representative of the temperature of said bandgap material based on said comparison is provided as a feedback input to said means for heating said bandgap material.

13. A temperature detection apparatus as claimed in claim 11, wherein said means for heating said bandgap material comprises said source of optical energy.

14. A temperature detection apparatus as claimed in claim 13, which said source of optical energy is an incandescent projection lamp.

15. A method of indicating the temperature of a layer of bandgap material comprising the steps of:
   directing optical energy to said layer at a narrow band spectral range which has an energy slightly above the bandgap of said material,
   detecting the amplitude of optical energy reflected by said layer,
   processing said reflected energy to determine the temperature of said layer.

16. The method according to claim 15, wherein said layer of bandgap material is GaAs.

17. The method according to claim 15, wherein the step of directing optical energy includes projecting optical energy from an incandescent projection lamp.

* * * * *